Feb. 15, 1927.
J. B. WATSON
1,618,120
GUARD FOR BUZZ PLANERS
Filed April 8, 1926
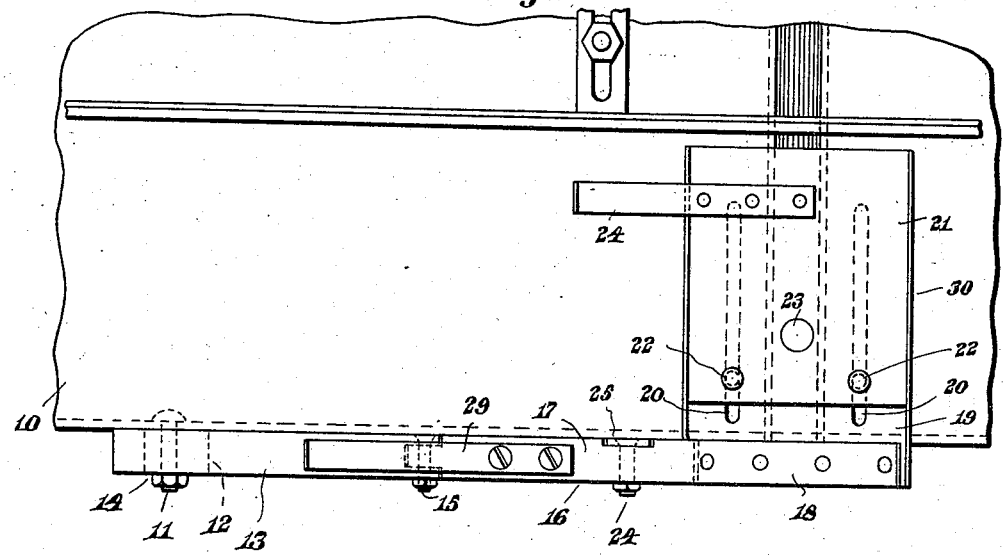
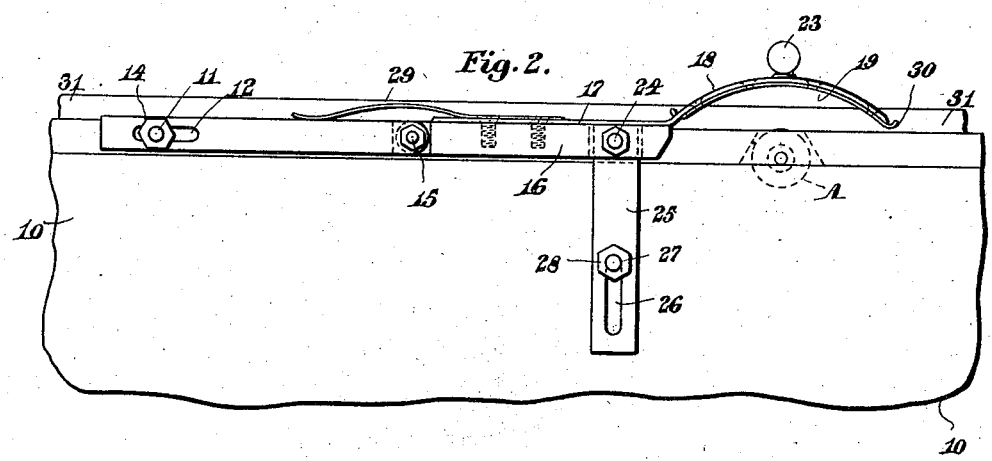
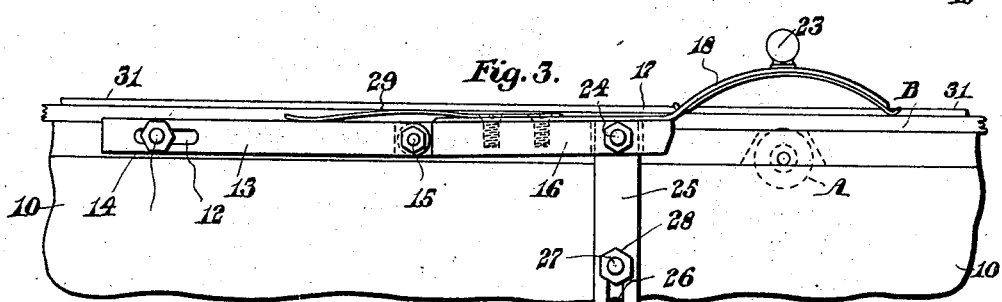
Inventor:
James B. Watson,
by Walter E. Lombard,
Atty.

Patented Feb. 15, 1927.

1,618,120

UNITED STATES PATENT OFFICE.

JAMES B. WATSON, OF MATTAPAN, MASSACHUSETTS, ASSIGNOR OF ONE-THIRD TO JULIUS C. REICHE, OF ARLINGTON, MASSACHUSETTS, AND ONE-THIRD TO CLARENCE E. CATES, OF BRIGHTON, MASSACHUSETTS.

GUARD FOR BUZZ PLANERS.

Application filed April 8, 1926. Serial No. 100,523.

This invention relates to safety guards for wood-working machines and particularly for that class known as "buzz planers", the object being to prevent the hands of the operator being injured during the operation of the machine.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a safety guard embodying the principles of the present invention.

Figure 2 represents a front elevation of the same, and

Figure 3 represents a similar view showing the curved guard plates raised and resting upon a board being operated upon.

Similar characters indicate like parts throughout the several figures of the drawings.

In the drawings, 10 is a portion of the frame of a wood-working machine such as a "buzz planer" and from a side thereof extends a bolt or stud 11 which passes through a slot 12 in a bar 13 and has a nut 14 on the outer end thereof to prevent the displacement of said bar.

By means of this construction the bar 13 may move endwise relatively to said frame or it may move about the axis of said bolt to accommodate it to different conditions.

One end of the bar 13 has pivoted thereto at 15 an arm 16 to the upper face of which is secured a flat metal plate 17 which is curved upwardly at its outer end as indicated at 18.

Riveted to the under side of the curved portion 18 is a curved guard plate 19 which extends laterally from the plate 17 and has parallel slots 20 formed therein.

Superimposed upon the guard plate 19 is an extension plate 21 which is provided with headed rivets 22 extending through said slots 20.

The heads of the rivets 22 impinge upon the guard plate 19 and extension plate 21 in such a manner as to create sufficient friction to retain said extension plate 21 in any position to which it may be adjusted.

The extension plate 21 is provided with a knob 23 by which it may be moved endwise of the main guard plate 19.

To the upper face of the extension plate 21 and near its outer end is secured a strap 4 of spring metal, this strap extending laterally from the plate 21, the outer end of the strap being adapted to contact with the machine table to prevent any shock or undue stress upon the guard plates 19, 21 during the operation of the machine.

Pivoted to the arm 16 at 24 and depending therefrom is a slotted plate 25 through the slot 26 of which extends a bolt or stud 27 projecting from the side of the machine frame 10.

Threaded to the outer end of the bolt 27 is a nut 28 which retains the plate 25 upon said bolt or stud 27 and prevents the accidental displacement thereof.

The arm 16 is free at all times to move about its pivot 15, this movement being limited in either direction by the ends of the slot 26 coming into contact with bolt 27.

The arm 16 has secured to its upper face a flat spring 29, the free end of which bears upon the upper side of the bar 13, this spring tending to force the arm 16 downwardly with the upper end of slot 26 resting on the bolt 27.

The pivot 15 and spring 29 together form a knuckle joint so that the arm 16 may move relatively to the bar 13 or both arm 16 and bar 13 move together.

One edge of the guard plate 19 is curved upwardly as at 30 and is adapted to rest upon the work being operated upon by the working tools A beneath said guard plate.

When no work is upon the machine table the curved edge 30 is slightly above the surface of the said table.

By means of the knob 23 the guard plate 19 may be raised sufficiently about its pivot 11 to admit a board or other piece of work B beneath the edge 30.

By providing the pivot 11 and also the pivot 15 the bar 13 and arm 16 may be moved into any desired position to accommodate a wide range of thicknesses of work to be operated upon.

While the board B is being planed the edge 30 will remain in contact with the upper face of the board and if the board increases in thickness the spring 29 will yield sufficiently to allow for the variation in thickness, or both bar 13 and arm 16 may be raised about the pivot 11.

When it is desired to obtain access to the working tools the arm 16 and bar 13 may be raised and the whole device swung over onto the table about the axis of bolt or stud 11, the plate 25 being first displaced from stud 27.

The board B is guided by the straight edge 31 at the back of table which is adjustably mounted on the machine table in the usual manner.

This makes a very simple but effective guard for machines of the character described which is very inexpensive to construct and easily operated.

When in use it is impossible for the operator to have his hands injured by the tools as these tools are completely covered over except at the rear end, which between the rear end of guard plate 21 and the guide 31 is left uncovered in order that the edge of the board may be planed, the board being held against the guide 31 during this operation.

Not only are the hands of the operator protected by the guard plate but his eyes and face are also protected as the guard plates prevent any object being thrown into the face of the operator while the machine is in use.

It is believed that the operation and many advantages of the invention will be understood readily without further description.

Having thus described my invention, I claim:

1. The combination of a horizontally disposed bar secured to the side of a machine frame provided with revoluble working tools; an arm pivoted to the end of said bar; a guard plate extending laterally from the end of said arm over the working tool; yielding means for retaining said guard plate in contact with the work; and means for limiting the movement of said arm about its pivot.

2. The combination of a horizontally disposed bar secured to the side of a machine frame provided with revoluble working tools; means permitting end movement of said bar relatively to said frame; an arm pivoted to the end of said bar; a guard plate extending laterally from the end of said arm over the working tools; and means for limiting the movement of said arm about its pivot.

3. The combination of a bar secured to the side of a machine frame provided with revoluble working tools; an arm pivoted to the end of said bar; a spring secured to the upper side of said arm and projecting over and in contact with said bar; a guard plate extending laterally from the end of said arm over the working tools; and means for limiting the movement of said arm about its pivot.

4. The combination of a bar secured to the side of a machine frame provided with revoluble working tools; an arm pivoted to the end of said bar; a guard plate extending laterally from the end of said arm over the working tools; a strap secured to the outer end of the guard plate and extending laterally therefrom adapted to contact with the machine table; and means for limiting the movement of said arm about its pivot.

5. The combination of a bar secured to the side of a machine frame provided with revoluble working tools; an arm pivoted to the end of said bar; a slotted plate pivoted to the free end of said arm; means on said frame extending through the slot of said plate and serving as a guide therefor; a guard plate extending laterally from the end of said arm over the working tools; yielding means for retaining said guard plate in contact with the work; and means for limiting the movement of said arm about its pivot.

6. The combination of a bar pivoted to the side of a machine frame provided with revoluble working tools; an arm pivoted to the end of said bar; a guard plate extending laterally from the end of said arm over the working tools; and means for limiting the movement of said bar about its pivot.

7. The combination of a bar pivoted to the side of a machine frame provided with revoluble working tools; means permitting end movement of said member endwise relatively to said frame and swinging movement about its pivot; an arm pivoted to the end of said bar; a guard plate extending laterally from the end of said arm over the working tools; and means for limiting the movement of said bar about its pivot.

8. The combination of a bar pivoted to the side of a machine frame provided with revoluble working tools; an arm pivoted to the end of said bar; a spring secured to the upper side of said arm and projecting over and in contact with said bar; a guard plate extending laterally from the end of said arm over the working tools; and means for limiting the movement of said bar and arm about their pivots.

9. The combination of a bar pivoted to the side of a machine frame provided with revoluble working tools and movable endwise on said pivot; an arm pivoted to the end of said bar; a guard plate extending laterally from the end of said arm over the working tools; a strap secured to the outer end of the guard plate and extending laterally therefrom adapted to contact with the machine table; and means for limiting the movement of said bar and arm about their pivots.

Signed by me at 746 Old South Bldg., Boston, Mass., this 1st day of April, 1926.

JAMES B. WATSON.